United States Patent
Yamada

(10) Patent No.: US 6,600,816 B1
(45) Date of Patent: Jul. 29, 2003

(54) CONNECTION MANAGEMENT SERVICING METHOD FOR COMMUNICATION CHANNEL

(75) Inventor: Yoshiko Yamada, Tokyo (JP)

(73) Assignee: Mitsubishi Denki Kabushiki Kaisha (JP)

(*) Notice: Subject to any disclaimer, the term of this patent is extended or adjusted under 35 U.S.C. 154(b) by 0 days.

(21) Appl. No.: 09/341,276

(22) PCT Filed: Apr. 22, 1998

(86) PCT No.: PCT/JP98/01853

§ 371 (c)(1),
(2), (4) Date: Jul. 7, 1999

(87) PCT Pub. No.: WO99/55068

PCT Pub. Date: Oct. 28, 1999

(51) Int. Cl.[7] .............................. H04M 3/20; H04M 7/00
(52) U.S. Cl. ................... 379/192; 379/45; 379/208.01; 379/221.03
(58) Field of Search ....................... 379/201.01, 221.03, 379/221.04, 221.05, 221.06, 221.07, 37, 45, 188, 190, 191, 192, 193, 208.01

(56) References Cited

U.S. PATENT DOCUMENTS

| | | | | |
|---|---|---|---|---|
| 5,295,183 A | * | 3/1994 | Langlois et al. | 379/112.04 |
| 5,359,649 A | * | 10/1994 | Rosu et al. | 379/221.07 |
| 5,844,974 A | * | 12/1998 | Ichikawa | 379/138 |
| 5,953,403 A | * | 9/1999 | Lefort et al. | 379/221.03 |
| 6,345,092 B1 | * | 2/2002 | Hoshi | 379/234 |

FOREIGN PATENT DOCUMENTS

| | | | |
|---|---|---|---|
| JP | 56-086565 A | 7/1981 | H04M/3/22 |
| JP | 1157656 | 6/1989 | H04M/3/22 |
| JP | 05-022414 A | 1/1993 | H04M/3/22 |
| JP | 06-261061 | 9/1994 | H04L/12/28 |
| JP | 7030657 | 1/1995 | H04M/3/42 |
| JP | 8126617 | 5/1996 | A61B/5/00 |
| JP | 983644 | 3/1997 | H04M/3/12 |
| JP | 09-093339 A | 4/1997 | H04M/3/20 |

* cited by examiner

Primary Examiner—Harry S. Hong
(74) Attorney, Agent, or Firm—Rothwell, Figg, Ernst & Manbeck, p.c.

(57) ABSTRACT

A service method of connection management for a communication line is established to perform a desired connection of the communication line in accordance with a telephone caller's request when the caller wants to be connected to a called person by way of the communication line. The method includes the steps of: detecting whether or not the communication line is crowded; measuring a passed time of a connected state of the communication line if the communication line is crowded; determining whether or not the passed time of the connected state has reached a predetermined set-up time; and compulsorily interrupting the connected state of the communication line when the passed time of the connected state has reached the predetermined set-up time. Thus, even if a communication line is very crowded because a disaster has happened, it is sure to enable more people to make phone calls, without producing a situation in which the communication line is occupied by only few people.

4 Claims, 5 Drawing Sheets

CONNECTION MANAGEMENT SERVICING METHOD FOR COMMUNICATION CHANNEL

TECHNICAL FIELD

The present invention relates to a service method of connection management for a communication line capable of providing a service of line connection to a telephone caller (a person using the communication line to conduct his or her desired communication) on a communication line such as a telephone line.

BACKGROUND ART

FIG. 5 is a block diagram showing a flowchart indicating a conventional service method of connection management for a communication line, as disclosed in Japanese Unexamined Patent Publication No. 7-30657. As shown in FIG. 5, a step S1 is set to indicate to a user several kinds of charges, a step S2 is set for selecting one kind of charge from the several kinds of charges, a step S3 is provided for setting a connection frequency in accordance with the request of a telephone caller, a step S4 is provided for performing a desired connection in a communication line in accordance with the caller's demands.

An operation of a system shown in FIG. 5 may be described in the following. Namely, a service system of connection management for a communication line is used to provide a line connection service when there is a request from a telephone caller who wants the communication line to be connected to another person (a called person). At this time, a caller is perhaps willing to pay a kind of high charge in order to obtain a line connection in preference to (earlier than) other users. For this reason, at least two kinds of different charges should be shown to the caller (at step S1), so that the caller is allowed to select one kind of charge from the several kinds of charges (at step S2). In this way, a connection frequency is set (at step S3) at a predetermined rate corresponding to a kind of charge selected by the caller, and an operation for the connection of a communication line is controlled (at step S4) in accordance with the connection frequency set at the step S3.

However, there is at least one problem associated with the above-discussed conventional service method of connection management for a communication line. For example, there might be a situation where a communication line is extremely crowded because a lot of people want to use the line at exactly the same time since a disaster has happened. During such an emergency, every person wants to obtain a line connection as soon as possible and thus requires a high connection frequency, resulting in a problem that the existing communication lines are not enough at all. This, however, will produce another problem. Namely, during an emergency, even if a communication line can be extremely crowded, a caller will try to make a phone call again and again. Once the caller is successful in getting contact with another person (a called person) by being connected with each other, he or she will not easily stop his or her talking. As a result, it is impossible for other people to use the communication line to make their desired phone calls.

The present invention is to solve the above-discussed problem, its purpose is to provide an improved service method of connection management for a communication line, which method is capable of allowing a lot of people to use a communication line during a short time period, regardless of a situation in which a disaster has occurred and a communication line has become extremely crowded because many people want to obtain a desired line connection as soon as possible (in particular, every person wants to be connected to a desired destination in preference to other people).

DISCLOSURE OF INVENTION

According to one aspect of the present invention, there is provided a service method of connection management for a communication line, said method being capable of performing a desired connection of the communication line in accordance with a telephone caller's request when the caller wants to be connected to a called person by way of the communication line, said method comprising the steps of: detecting whether or not the communication line is crowded; measuring a passed time of a connected state of the communication line if the communication line is crowded; determining whether or not the passed.time of the connected state has reached a predetermined set-up time; and compulsorily interrupting the connected state of the communication line when the passed time of the connected state has reached the predetermined set-up time.

According to another aspect of the present invention, said service method of connection management is capable of performing a preference connection whose connection frequency has been changed with respect to a called person in accordance with a specific charge.

According to a further aspect of the present invention, said method further comprises a step of giving out an advance notice indicating a coming compulsory interruption of a connected state of a communication line, According to a still further aspect of the present invention, said method further comprises a step of varying a time period from the start of a telephone call to a compulsory termination of a connected state of a communication line, said variation being performed in view of a crowded extent of a communication line.

BEST MODE FOR CARRYING OUT THE INVENTION

Embodiment 1

Figure 1:
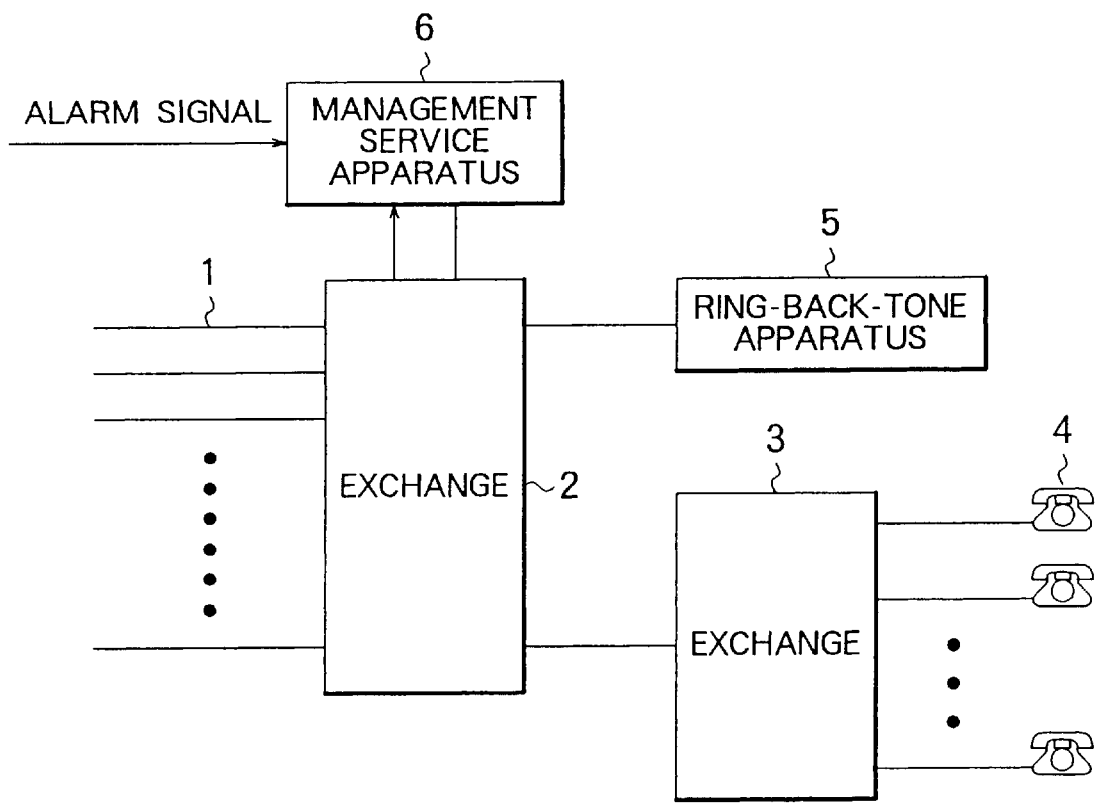
FIG. 1 is an explanatory view indicating one embodiment of a system for carrying out an improved service method of connection management for a communication line, constituted in accordance with the present invention.

FIG. 1 is an explanatory view indicating one embodiment of a system for carrying out an improved service method of connection management for a communication line, which is constituted in accordance with the present invention. Referring to FIG. 1, a reference numeral 1 is used to represent an input line, reference numerals 2 and 3 are each used to represent an exchange, a reference numeral 4 is used to represent a reception telephone, a reference numeral 5 is used to represent a ring-back-tone apparatus, a reference numeral 6 is used to represent a management service apparatus which is constructed to perform a desired connection management service for a communication line, made according to the present invention.

Figure 2:
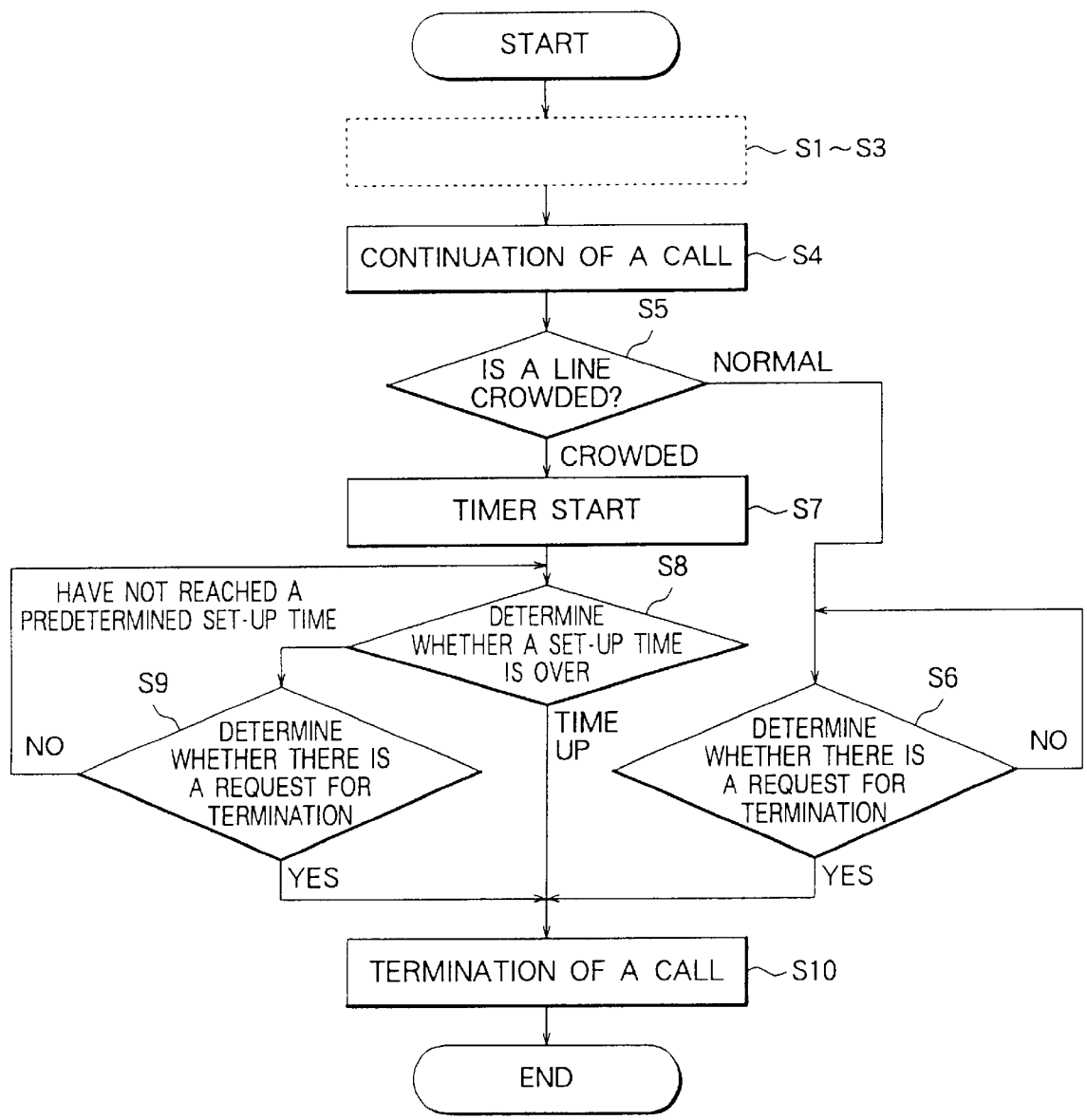
FIG. 2 is a flowchart indicating an improved service method of connection management for a communication line, constituted in accordance with one embodiment of the present invention.
Figure 5:
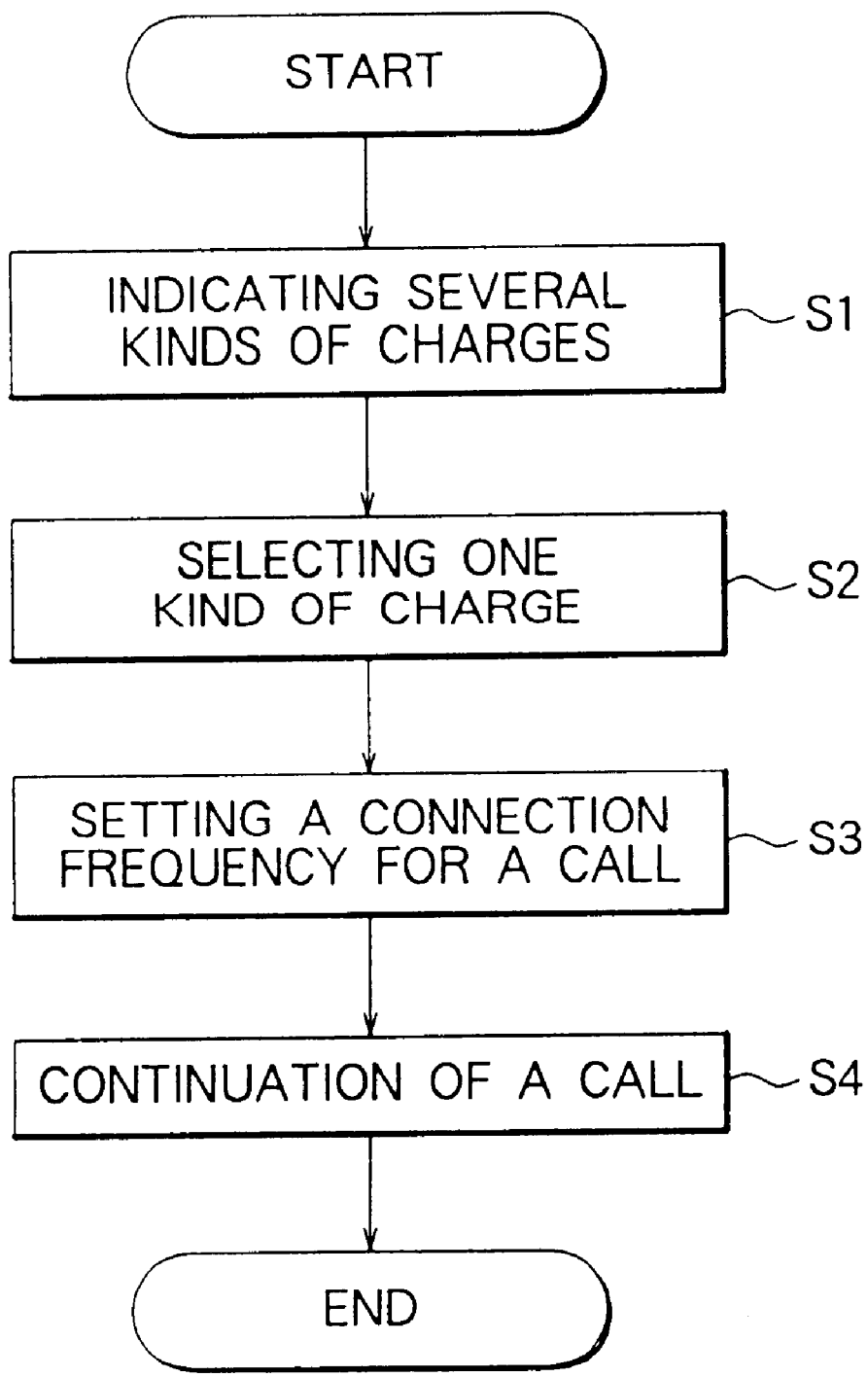
FIG. 5 is a flowchart indicating a service method of connection management for a communication line, constituted in accordance with a prior art.

The ring-back-tone apparatus 5 is used to store various received telephone calls, in a manner such that a preference connection (whose connection frequency has been changed in accordance with a conventional charge system shown in FIG. 5) can be carried out. The management service apparatus 6 serves as a controlling section which is provided to perform a connection management service (of the present invention) for a communication line, in accordance with a program contained within the apparatus 6. FIG. 2 is a flowchart indicating an improved service method of connection management for a communication line, constituted in accordance with one embodiment of the present invention, which flowchart may also be used to indicate a set of operations performed by a program contained within the management service apparatus 6.

The operations performed by the program will be described in detail below with reference to FIG. 2. Referring to FIG. 2, the operations performed at steps S1–S4 are the same as the above conventional connection service which can perform a preference connection shown in the above FIG. 5 (step S1–S4). Then, as soon as a connection of a phone call is completed (step S4), it is detected whether the line is crowded or not (step S5). Such kind of a detection may be carried out with the use of a state signal C fed from the exchange 2, but it is also possible to use a malfunction indicating signal fed from an outside unit to perform said detection or determination. If it has been determined that a present situation is normal, i.e., a communication line is not in a crowded state, the communication line will be maintained in a connected state until a caller requests that the connected state be terminated at a step S6, thereby performing an interruption (step S10) upon receiving an interruption instruction from the caller.

On the other hand, if it is determined at the step S5 that the communication line is crowded, a timer is started to measure a passed time of a connected state of the communication line (step S7). In practice, such a timer may be constituted by a software. If a passed time of a connected state has not reached a predetermined set-up time which was set in advance, the line will be kept at a connected state (step S9) until a caller requests that the connected state be terminated. On the other hand, if a passed time of a connected state has reached the predetermined set-up time (step S8), the connected state of the communication line is terminated, i.e., the caller's telephone call is stopped (step S10).

In this way, if a communication line is crowded because a disaster has occurred, it is possible to prevent some people from occupying the line, thereby allowing more people to make phone calls.

Although it has been indicated in FIG. 2 that the method of the present invention includes the steps S1–S3 which are the same operations (for obtaining a preference connection) as in a prior art, it is also possible that the method of the present invention involves only a process including the steps from the step S4 onwards (not involving a preference connection), thereby obtaining a predetermined desired effect which is the same as described in this embodiment.

Embodiment 2

Figure 3:
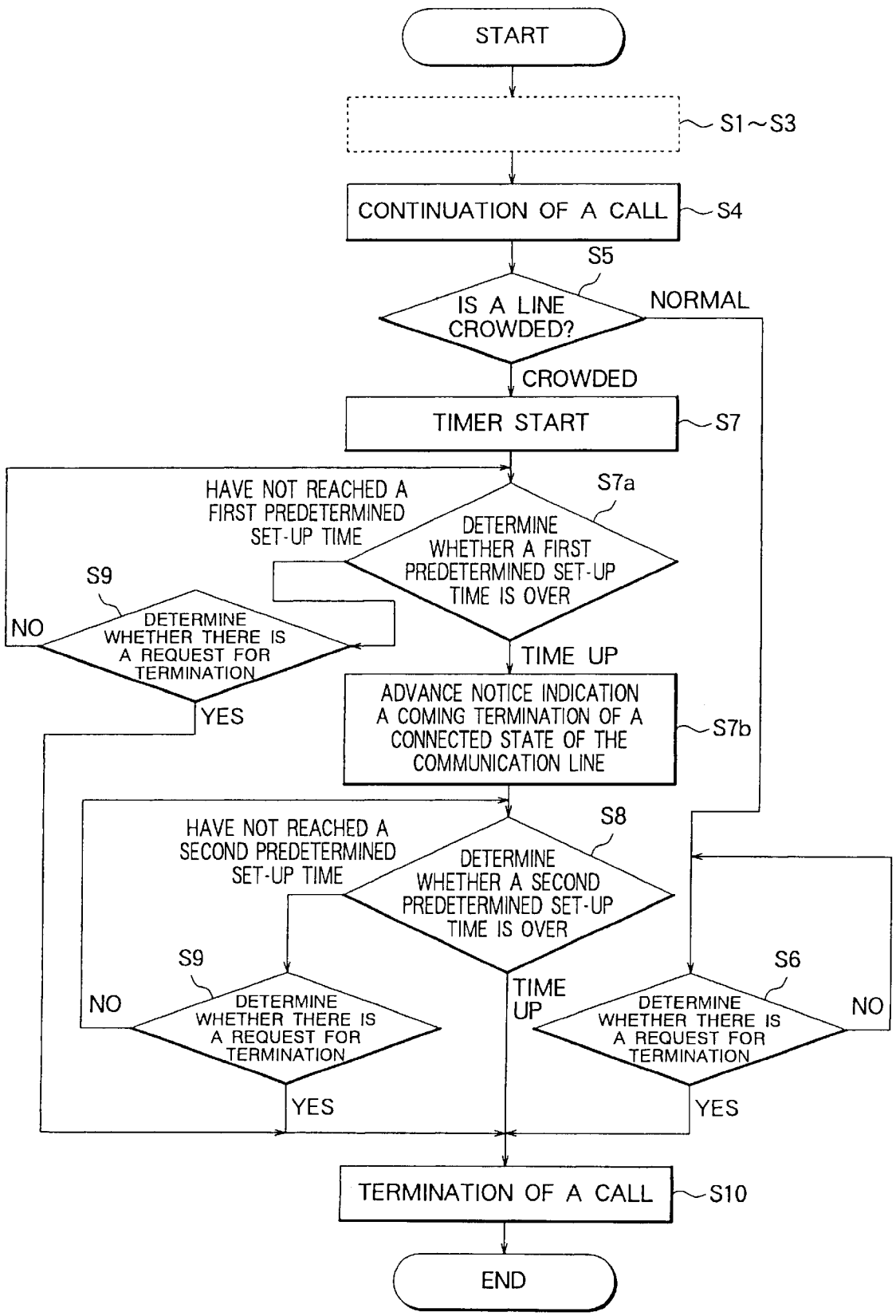
FIG. 3 is a flowchart indicating an improved service method of connection management for a communication line, constituted in accordance with another embodiment of the present invention.

FIG. 3 is a flowchart indicating an improved service method of connection management for a communication line, constituted in accordance with another embodiment of the present invention. As shown in FIG. 3, a method according to the present embodiment is formed by adding a step 7a, 7b and 7c in the method shown in FIG. 2. In more detail, the method according to this embodiment is required to have two predetermined time periods set in advance (two set-up times). When a first set-up time is up (step S7a), an advance notice indicating a coming termination of a connected state of the communication line will be given out (step S7b) to the telephone caller by means of a signal and a kind of sound. Then, when a second set-up time is up, the connected state of the communication line is terminated (steps S8–S10). However, a time period from the advance notice to an actual termination may be set to be, for example, one minute.

In this manner, since a telephone caller is able to obtain an advance notice indicating a coming termination of a connected state of the communication line, the telephone caller is allowed to avoid an unpredicted sudden interruption in the midst of his or her telephone call.

Embodiment 3

Figure 4:
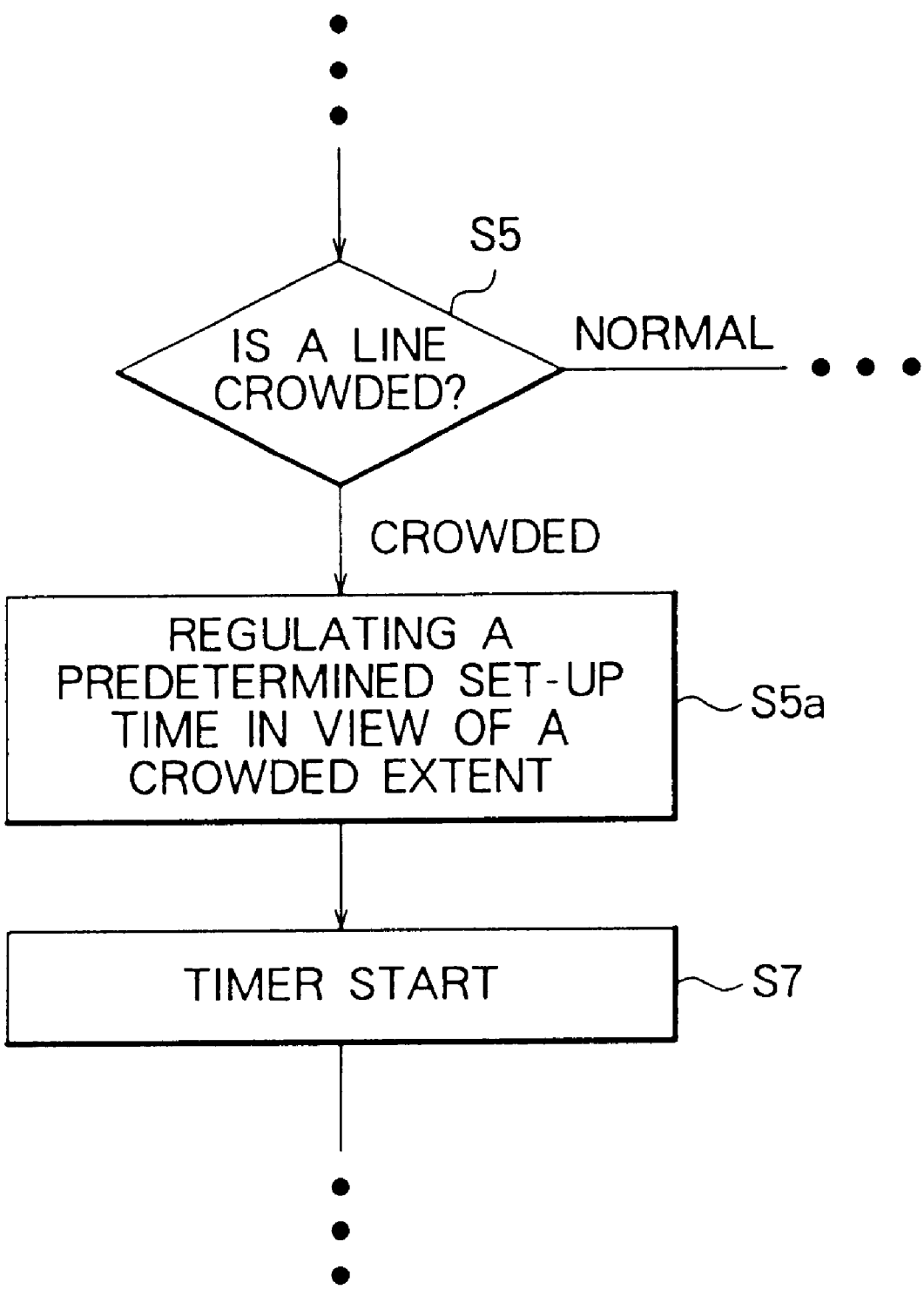
FIG. 4 is a flowchart partially indicating an improved service method of connection management for a communication line, constituted in accordance with a further embodiment of the present invention.

FIG. 4 is a flowchart partially indicating an improved service method of connection management for a communication line, constituted in accordance with a further embodiment of the present invention. A difference between the method shown in FIG. 4 and the methods shown in FIGS. 2 and 3 is that a step S5a is added in a position between the step S5 and the step S7, so as to perform an adjustment of a set-up time with respect to a passed time of a connected state of the communication line, in view of a crowded extent of the communication line. For example, in accordance with a state signal C (which is fed from the exchange 2 shown in FIG. 1) indicating a crowded extent of a communication line, it is possible that a set-up time may be gradually reduced in a manner of step by step and that such a set-up time can be made into a shortest one upon receiving a malfunction indicating signal E fed from an outside unit.

In this way, since it is possible to vary a time period from the start of a telephone call to a compulsory termination of a connected state of a communication line (such a variation is performed in view of a crowded extent of a communication line), it is sure to avoid an unnecessary compulsory interruption of a connected state of a communication line, thereby providing an improved service for line connection management for a communication line, which is sufficiently acceptable to a telephone caller.

INDUSTRIAL APPLICABILITY

As described above, with the use of the present invention, a service method of connection management for a communication line has been established to perform a desired connection of the communication line in accordance with a telephone caller's request when the caller wants to be connected to a called person by way of the communication line. The method comprises the steps of: detecting whether or not the communication line is crowded; measuring a passed time of a connected state of the communication line if the communication line is crowded; determining whether or not the passed time of the connected state has reached a predetermined set-up time; and compulsorily interrupting the connected state of the communication line when the passed time of the connected state has reached the predetermined set-up time. Thus, even if a communication line is very crowded because a disaster has happened, it is sure to enable more people to make phone calls, without producing a situation in which the communication line is occupied by only few people.

Further, since the service method of connection management according to the present invention provides a process including a preference connection whose connection frequency has been changed with respect to a called person in accordance with a specific charge, this method allows a user to use a conventional preference connection service on one hand, and at the same time enables more people to make phone calls on the other even when the line is very crowded, thereby avoiding an undesired situation in which the communication line is occupied by only few people.

Moreover, since the service method of connection management according to the present invention provides a process including a step of giving out an advance notice indicating a coming compulsory interruption of a connected state of a communication line, a telephone caller is able to in advance know that a connected state of the communication line will be terminated. Therefore, the telephone caller is allowed to avoid an unpredicted sudden interruption in the midst of his or her telephone call.

In addition, since the service method of connection management according to the present invention provides a process including a step of varying a time period from the start of a telephone call to a compulsory termination of a connected state of a communication line (such a variation is performed in view of a crowded extent of a communication line), it is allowed to avoid an unnecessary compulsory interruption of a connected state of a communication line, thereby providing an improved service of connection management for a communication line, with the service being sufficiently acceptable to many telephone callers.

What is claimed is:

1. A servicing method of managing a network and performing a desired connection to the network in accordance with a user's request, said method comprising the steps of:

detecting whether or not the network is congested;

measuring a connection time of another user connected to the network if the network is congested;

determining whether or not the connection time has reached a predetermined set-up time; and compulsively interrupting the connection when the connection time has reached the predetermined set-up time.

2. The method of claim 1, wherein said method performs a preference connection whose connection frequency has been changed in accordance with a specific charge.

3. The method of claim 1, further comprising a step of notifying a connected user of an upcoming interruption.

4. The method of claim 1, further comprising a step of adjusting a time period from the start of the connection to the end of the connection, notwithstanding the congested network.

* * * * *